United States Patent [19]

Sato

[11] 3,712,704
[45] Jan. 23, 1973

[54] FOCUSING DEVICE IN A CENTER FOCUSING TYPE BINOCULAR

[75] Inventor: Akira Sato, Tokyo, Japan

[73] Assignee: Nippon Kogaku K. K., Tokyo, Japan

[22] Filed: Dec. 23, 1971

[21] Appl. No.: 211,378

[30] Foreign Application Priority Data

Dec. 28, 1970 Japan..............................45/132664

[52] U.S. Cl......................................350/76, 350/36
[51] Int. Cl..............................................G02b 7/06
[58] Field of Search...................................350/76, 36

[56] References Cited

UNITED STATES PATENTS 3,484,149  12/1969  Becker et al. ..........................350/76

Primary Examiner—David H. Rubin
Attorney—Joseph M. Fitzpatrick et al.

[57] ABSTRACT

A center focusing type binocular having a first and a second body tube interconnected so that at least one of the body tubes is revolvable about a pivot sleeve, and inner lens frames for holding ocular systems therein and mounted for sliding along optical axes within the respective body tubes. The focusing device is improved in that the first body tube is formed with a guide groove extending axially from the end thereof adjacent to a T-shaped slidable tube, the second body tube is formed with a guide groove extending axially from the end thereof adjacent to a T-shaped rotatable ring, both grooves being parallel to the pivot sleeve, and an O-ring is interposed between each of the guide grooves and slidable shafts inserted in said grooves, whereby a perfect air-tight condition is maintained in the focusing device without using any seal means and a reduced torque is required to adjust the relative position of the two body tubes in accordance with the interpupillary distance of any viewer.

3 Claims, 4 Drawing Figures

FOCUSING DEVICE IN A CENTER FOCUSING TYPE BINOCULAR

BACKGROUND OF THE INVENTION

1. Field of the Invention

This invention relates to binoculars, and more particularly to a focusing device in center focusing type binoculars.

2. Description of the Prior Art

Some of the conventional binoculars are of the type in which a rotatable focusing knob centrally disposed between two body tubes is rotated to move the oculars in both body tubes at the same time thereby to effect focusing, and a vision adjusting ring holding one of the oculars and screwed into one of the body tubes is rotated to adjust the focal point of said one ocular and thereby compensate for any vision difference between the two eyes of a viewer.

Such conventional binoculars have been very inconvenient to operate in that either the focusing operation or vision adjusting operation must be effected at the center between the two body tubes and the other must be effected in the ocular mount portion. A further disadvantage of such binoculars is that their oculars are often adjustable by screws so that they cannot be maintained sufficiently air-tight to prevent the entry of dust and/or humidity.

A solution to these problems has been shown in U.S. Pat. No. 3,484,149, which discloses a binocular comprising focusing knobs and a rotatable vision adjusting knob all disposed between two body tubes. This binocular, however, has suffered from a disadvantage that openings formed in the pivot sleeve thereof can not be completely sealed even by the use of seal means, and a further disadvantage that the presence of such seal means greatly increases the torque required to adjust the distance between the two oculars in accordance with the interpupilar distance of the viewer.

SUMMARY OF THE INVENTION

Accordingly, I propose, by the present invention, to eliminate all the foregoing disadvantages existing in the conventional focusing device in a center focusing type binocular.

According to one aspect of the present invention, there is provided in a center focusing type binocular, a focusing device in which a perfect air-tight condition may be maintained and the torque required to adjust the distance between two body tubes of the binocular in accordance with the interpupilar distance of any viewer is considerably reduced.

The focusing device of the present invention is incorporated in a center focusing type binocular which has a first body tube, a second body tube for vision adjustment interconnected so that at least one of the body tubes is revolvable about a pivot sleeve, and inner lens frames for holding ocular systems therein and mounted for sliding along optical axes within the respective body tubes. The focusing device comprises a T-shaped slidable tube fitted in the pivot sleeve and having an internally threaded side wall portion and two axially elongated slots formed substantially centrally of the length of the ring, whose one end is formed with a flange. A stationary main shaft is mounted within the pivot sleeve along the center axis thereof and has a pin extending through the two slots and fixed to the pivot sleeve. A rotatable focusing knob consisting of an externally threaded ring and a knob member is rotatably fitted on the stationary main shaft along one half of the length thereof bisected by the pin of the stationary main shaft. The rotatable focusing knob is screwed into the T-shaped slidable ring. A T-shaped rotatable ring consisting of a slotted flange portion and an externally threaded portion is rotatably and slidably fitted on the stationary main shaft along the other half of the length thereof bisected by the pin of the stationary main shaft. The T-shaped rotatable ring is screwed into the internally threaded portion of the T-shaped slidable ring. A rotatable vision adjusting knob consisting of a pin extending through the slot in the flange of the T-shaped rotatable ring and a knob member is rotatably mounted at the end of the stationary main shaft which is remote from the focusing knob.

The first body tube is formed with a guide groove extending axially from the end thereof adjacent to the T-shaped slidable ring. The second body tube is formed with a guide groove extending axially from the end thereof adjacent to the T-shaped rotatable ring. The guide grooves are parallel to the pivot sleeve. A slidable shaft is inserted into each of the grooves. An O-ring is interposed between each of the guide grooves and each of the slidable shafts and adjacent to the opposite ends of the first and second body tubes. The slidable shaft which is adjacent to the second body tube is formed with a circumferentially extending recess at one end thereof, the recess loosely receiving therein the flange of the T-shaped rotatable ring. The slidable shaft which is adjacent to the first body tube has one end thereof fixed to the T-shaped slidable ring; and a connecting arm is provided between each of the slidable shafts and each of the inner lens frames.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENT

Figure 1:
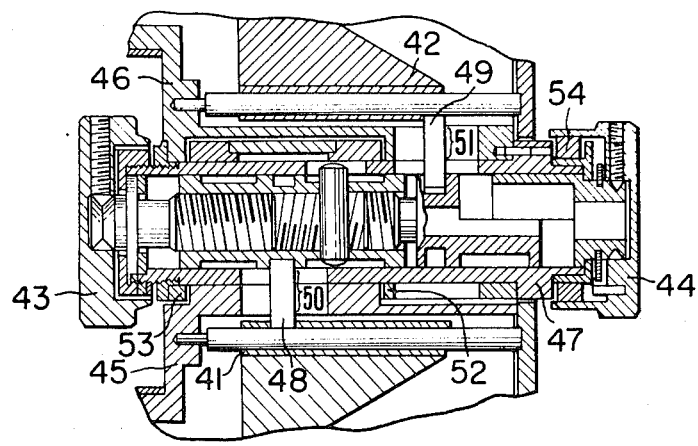
FIG. 1 is a fragmentary view, in longitudinal section, of the binocular according to U.S. Pat. No. 3,484,149 which is referred to for comparison with the present invention.

In order to make the present invention better understood, the binocular disclosed in U.S. Pat. No. 3,484,149 will be considered with reference to FIG. 1. Members 41 and 42 are respectively connected to two inner lenses (not shown). A knob 43 may be rotated to move the two inner lenses in the same direction and focus these lenses, while another knob 44 may be rotated to move one of the inner lenses and focus said one lens alone, thereby compensating for any vision difference between viewer's two eyes. In this binocular, openings 50 and 51 are formed between body tubes 45, 46 and a pivot sleeve 47 so that pins 48 and 49 are reciprocally movable in these openings. The openings 50 and 51 are sealed by means of seal members 52, 53 and 54. This arrangement is disadvantageous in that the seal members fail to maintain complete air-tight integrity and that the presence of such seal members 52 and 53 requires a greater torque to be applied when the viewer adjusts the binocular to this interpupilar distance.

Figure 3:
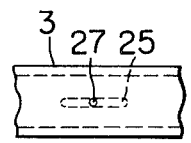
FIG. 3 is a sectional view taken along line A—A of FIG. 2.
Figure 4:
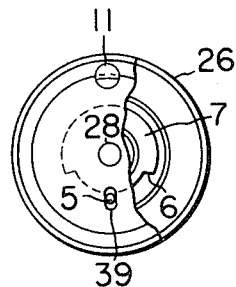
FIG. 4 is a sectional view taken along line B—B of FIG. 2.
Figure 2:
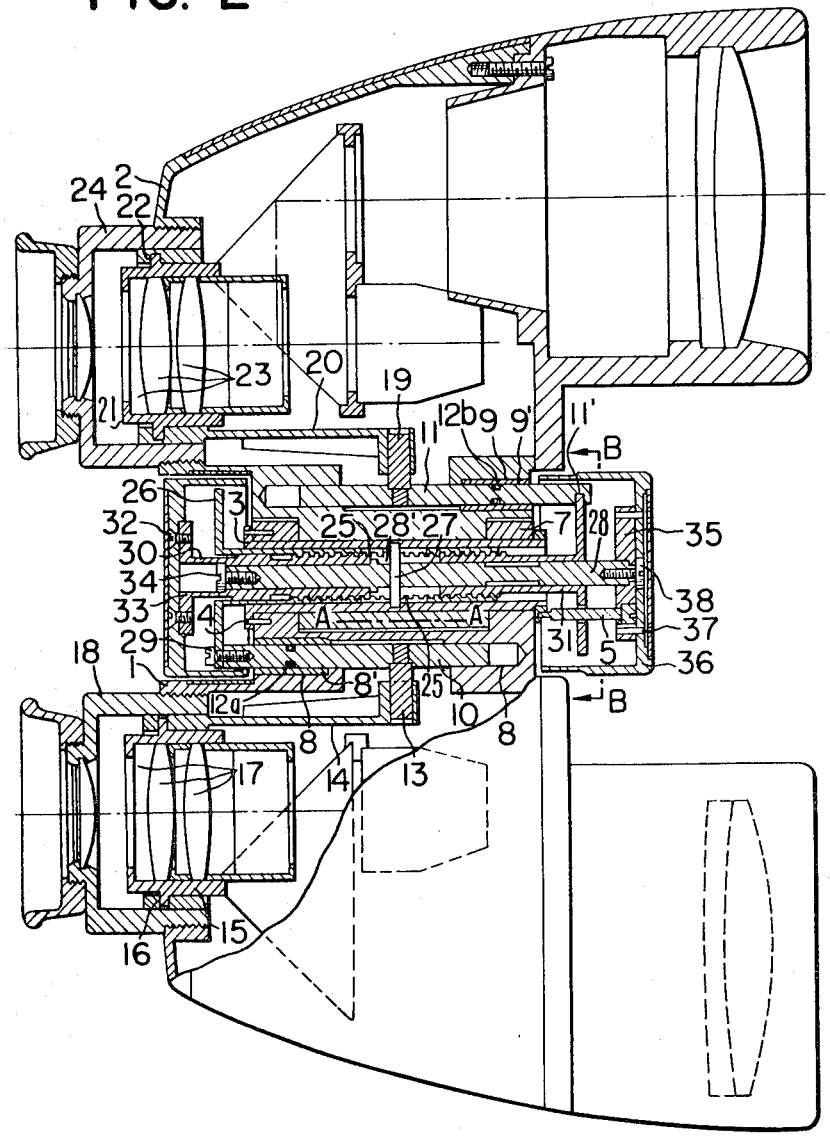
FIG. 2 is a longitudinal section of the binocular according to an embodiment of the present invention.

Referring not to FIGS. 2, 3 and 4, there is shown an embodiment of the present invention wherein a first body tube 1 and a second body tube 2 are interconnected by a pivot sleeve 3 and pins 4 in such a manner that one of the two body tubes can revolve about the pivot sleeve 3. The pivot sleeve 3 has an anti-slip nut 7 screwed thereto (FIGS. 2 and 4), which nut 7 also provides a stopper (i.e., cut-away 6 in FIG. 4) for a pin 5 which will be described. The first body tube 1 is formed with a groove 8 extending axially from one end thereof and parallel to the pivot sleeve 3, and a guide bushing 8' is bonded to the wall of the groove 8. The groove 8 and guide bushing 8' together constitute a guide groove. Similarly, the second body tube 2 is formed with a groove extending axially from one end thereof and parallel to the pivot sleeve 3, and a guide bushing 9' is bonded to the wall of the groove 9 together constituting another guide groove. Shafts 10 and 11 are slidably received in the respective guide grooves and seal members such as O-rings 12a and 12b are interposed between the respective guide bushings 9, 9' and the respective slidable shafts 10, 11. A connecting shaft 13 has one end secured to the slidable shaft 10 and the other end secured to a connecting arm frame 14, which in turn is secured to an ocular frame 15 by means of a threaded ring 16. The ocular frame 15 holds an ocular system 17 therewithin, and the connecting arm frame 14, together with the ocular frame 15, is slidable along the inner side wall of an ocular casing 18 which forms a part of the first body tube 1. The connecting shaft 13 and the connecting arm frame 14 together constitute a connecting arm, and it will be appreciated that the slidable shaft 10, connecting arm 13–14 and ocular frame 15 are all movable together.

Similarly, a connecting shaft 19 has one end secured to the slidable shaft 11 and the other end secured to a connecting arm frame 20, which in turn is secured to an ocular frame 21 by means of a threaded ring 22. The ocular frame 21 holds an ocular system 23 therewithin, and the connecting arm frame 20, together with the ocular frame 21, is slidable along the inner side wall of an ocular casing 24 which forms a part of the second body tube 2. The connecting shaft 19 and the connecting arm frame 20 together constitute a connecting arm. Thus, the slidable shaft 11, connecting arm 19–20 and ocular frame 21 are all movable together.

A slidable tube or ring 26, T-shaped in profile, is fitted in the pivot sleeve 3, which ring 26 has an internally threaded inner side wall portion and two axially elongated slots 25 formed through the side wall substantially at the center of its length, as shown in FIG. 3. One end of the tube 26 is formed with a flange portion, which is secured to the slidable shaft 10 by means of a screw 29. Thus, the T-shaped slidable ring 26, slidable shaft 10, connecting arm 13–14 and ocular frame 15 are all movable together. A stationary main shaft 28 extends axially through the T-shaped slidable tube 26 and has a pin 27 passing through the two slots 25 in the tube 26 and secured to the pivot sleeve 3. A ring 30 having an externally threaded portion is screwed into the T-shaped slidable tube 26 for rotation relative to the stationary main shaft 28. A rotatable knob member 33 is secured to the threaded ring 30 by means of screws 32 so that the knob member 33 and ring 30 together constitute a rotatable focusing knob, which is retained against axial sliding motion by a projection 28' formed on the stationary main shaft 28 and a screw 34 fixing the knob to the main shaft.

At that end of the T-shaped slidable tube 26 which is remote from its flanged end, a T-shaped rotatable ring 31 is fitted in the tube 26 for rotation and axial sliding relative to the stationary main shaft 28. The T-shaped rotatable ring 31 includes an externally threaded portion and a flanged portion formed with an oval slot 39, as shown in FIG. 4. The flange of the T-shaped rotatable ring 31 is loosely received in a recess 11' formed circumferentially of the slidable shaft 11 at the adjacent end thereof. A disc 35, secured to the main shaft 28 has a rotatable knob member 36 secured thereto by means of pins 37, and also carries the pin 5 which extends through the oval slot 39 so as to engage the cut-away 6 of the nut 7. The disc 35 and rotatable knob member 36 together constitute a rotatable vision adjusting knob, which is retained against axial movement by a screw 38 attaching it to the stationary main shaft 28, for rotation relative thereto.

Description will now be made of the process for driving the respective focusing mechanisms in the above-described binocular.

A focusing operation may be achieved by rotating the focusing knob member 33. More specifically, when the threaded ring 30 is rotated with the rotation of the knob member 33, the T-shaped slidable tube 26 is caused to slide axially with the aid of the pin 27 guided in the slot 25, so that the slidable shaft 10, the connecting shaft 13, the connecting arm frame 14 and the ocular system 17 held by and within the ocular frame 15 are all displaced axially. At the same time, the T-shaped rotatable ring 31 is rotated since the thread on this ring are in mesh with the threads on the T-shaped slidable tube 26, whereby the ring 31, having its flange engaged with the recess 11', causes the slidable shaft 11, connecting shaft 19, connecting arm frame 20 and ocular system 23 held by and within the ocular frame 21 all to be axially displaced in the same direction and over the same distance as the aforesaid displacement of the first ocular system 17 and its corresponding parts.

Adjustment for the correction of the vision difference between the two eyes of a viewer may be achieved by rotating the rotatable vision adjusting knob member 36. In this case, the flange of the T-shaped rotatable ring 31 is rotated by the pin 5 and slides in the recess 11' of the slidable shaft 11 to thereby displace the slidable shaft 11 in its axial direction. It will be seen that during this adjustment, the T-shaped slidable tube 26 remains stationary so that the ocular system 23 alone is axially displaced to correct and compensate for vision difference between the eyes.

Although the above-described embodiment is constructed such that rotation of the rotatable focusing knob and rotatable vision adjusting knob causes displacement of the oculars, it is of course possible to adopt such a construction that rotation of those knobs causes displacement of objectives or prisms depending on the type of the optical systems used.

According to the present invention, as has been noted above, the guide grooves 8 and 9 are the only openings formed in the body tubes and these grooves can be maintained perfectly air-tight because of the O-rings interposed between the respective guide grooves and the slidable shaft. This completely prevents any clouding in the interior of the binocular, and the absence of any seal member between the body tubes and the pivot sleeve ensures smooth adjustment of the distance between the two body tubes in accordance with the interpupilar distance of the viewer. Additionally, as has been noted, the torque required for adjustment of the body tubes to suit the interpupilar distance of the viewer is considerably reduced.

I believe that the construction and operation of my novel center focusing binocular will be understood, and that its advantages will be fully appreciated by those persons skilled in the art.

I claim:

1. A focusing device in a center focusing type binocular having a first body tube and a second body tube for vision adjustment interconnected so that at least one of the body tubes is pivotable about an axis between the tubes, and lens frames holding ocular systems and mounted for sliding along optical axes within the respective body tubes, said focusing device comprising:
   a stationary main shaft the central axis of which is coincident with the pivot axis between said tubes;
   rotatable focusing means including an externally threaded ring and a knob member, said focusing means being rotatably fitted on said stationary main shaft along a portion of its length;
   tube means having internal threads in mesh with the externally threaded ring of said focusing means, said tube means having axially elongated slots formed substantially centrally of its length, and a flange at one end thereof;
   a pivot sleeve positioned around said tube means;
   a pin extending laterally through said main shaft and through said slots in said tube means and secured to said pivot sleeve;
   ring means including a slotted flange and an externally threaded shank portion, said ring means being rotatably and slidably fitted on said stationary main shaft along the other portion of its length, said ring means being screwed into the internally threaded portion of said tube means;
   an ocular system in each of said body tubes and shiftable longitudinally relatively to said main shaft upon rotation of said focusing knob; and
   means connecting one ocular system with said tube means and the other ocular system with said ring means for shifting said ocular systems upon rotation of said focusing knob.

2. A focusing device according to claim 1, wherein a vision adjusting knob is rotatably mounted at the end of said main shaft remote from said focusing knob and includes a pin extending through the slot in said ring means and a knob member, whereby rotation of said knob member and pin effects rotation of said ring means and independent longitudinal shifting of the respective connecting means and said other ocular system in one of said body tubes to correct for the vision difference between the eyes of a viewer.

3. A focusing device in a center focusing type binocular having a first body tube and a second body tube for vision adjustment interconnected so that at least one of the body tubes is pivotable about an axis between the tubes, and lens frames holding ocular systems and mounted for sliding along optical axes within the respective body tubes, said focusing device comprising:
   a stationary main shaft the central axis of which is coincident with the pivot axis between said tubes;
   rotatable focusing means including an externally threaded ring and a knob member, said focusing means being rotatably fitted on said stationary main shaft along a portion of its length;
   tube means having internal threads in mesh with the externally threaded ring of said focusing means, said tube means having axially elongated slots formed substantially centrally of its length, and a flange at one end thereof;
   a pivot sleeve positioned around said tube means;
   a pin extending laterally through said main shaft and through said slots in said tube means and secured to said pivot sleeve;
   ring means including a slotted flange and an externally threaded shank portion, said ring means being rotatably and slidably fitted on said stationary main shaft along the other portion of its length, said ring means being screwed into the internally threaded portion of said tube means;
   a vision adjusting knob rotatably mounted at the end of said main shaft remote from said focusing means, said vision adjusting knob including a pin extending through the slot in said flange of said ring means and a knob member;
   said first body tube being formed with a guide groove extending axially from the end thereof adjacent to said tube means, said second body tube being formed with a guide groove extending axially from the end thereof adjacent to said ring means, both of said guide grooves being parallel to said pivot sleeve;
   a slidable shaft inserted into each of said grooves;
   sealing means interposed between each of said guide grooves and each of said slidable shafts and adjacent to the opposite ends of said first and second body tubes;
   said slidable shaft adjacent to said second body tube being formed with a circumferentially extending recess at one end thereof, said recess loosely receiving therein said flange of said ring means;

said slidable shaft adjacent to said first body tube having one end thereof fixed to said tube means; and connected means provided between each of said slidable shafts and one of said inner lens frames.

* * * * *